June 13, 1967  R. F. DEHN  3,325,606
CONDUCTOR BAR TYPE ELECTRICAL DISTRIBUTION SYSTEM
Filed Oct. 8, 1965  3 Sheets-Sheet 1

INVENTOR
ROY F. DEHN

BY *Hoffmann and Yount*

ATTORNEYS

INVENTOR
ROY H. DEHN
BY Hoffmann and Yount
ATTORNEYS

June 13, 1967 R. F. DEHN 3,325,606
CONDUCTOR BAR TYPE ELECTRICAL DISTRIBUTION SYSTEM
Filed Oct. 8, 1965 3 Sheets-Sheet 3

INVENTOR.
ROY H. DEHN
BY Hoffmann and Yount
ATTORNEYS

United States Patent Office 3,325,606
Patented June 13, 1967

3,325,606
CONDUCTOR BAR TYPE ELECTRICAL
DISTRIBUTION SYSTEM
Roy F. Dehn, Wickliffe, Ohio, assignor to The Cleveland Crane & Engineering Company, Wickliffe, Ohio, a corporation of Ohio
Filed Oct. 8, 1965, Ser. No. 494,187
15 Claims. (Cl. 191—40)

This application is a continuation-in-part of my copending application, Ser. No. 313,959, filed Oct. 4, 1963, for Trolley Conductor, now Patent No. 3,222,464. The subject matter of which application is included herein by reference.

The present invention relates to electric power conductor bar type electrical distribution systems, and more particularly to distribution systems for supplying electrical power to railway vehicles, and the like.

One of the principal objects of the invention is the provision of a new and improved structure for supporting an electric power conductor bar or an electric power distribution rail made up of a plurality of conductor bars which structures can be readily installed at any convenient location along the bar or rail and which restrains lateral and vertical movements of the bar or rail while permitting the bar or rail to shift longitudinally during expansion and contraction thereof caused, for example, by temperature changes. The structure also affords means for attaching the same to a suitable base and, if desired, for supporting protective boards along one or more sides of the bar or rail.

A further object of the invention is the provision of a new and improved support assembly for an electric power conductor bar or distribution rail having laterally spaced flanges extending therealong, the assembly comprising two separable parts, each having two oppositely facing spaced abutments between which the flanged portions of opposite sides of the bar or rail are received by the respective parts so that the bar or rail is held between the two sets of opposed abutments, means being provided for securing the two parts together after they have been individually applied to the flanged portions of opposite sides of the bar or rail to maintain the abutments in holding engagement with the bar or rail. By this construction, bar or rail support assemblies can be installed at any desired location along the bar or rail and they may be replaced without altering or disturbing the bar or rail. Preferably, the parts of the support assemblies are formed of a molded fiber glass reinforced resin body to provide a rugged electrical insulator between the rail and ground.

A still further object of the invention is the provision of a new and improved structure for supporting an electric power conductor or distribution rail and protective boards therefor in an electric power distributing system for railways and the like, the structure comprising a C-shaped bracket adapted to have the base section thereof secured to a tie or other support alongside the railway and on which base an insulator unit for supporting the distribution rail is located, the upright and overhanging sections of the bracket providing supports to which the protective boards may be attached to extend alongside and overhead of the bar or rail.

The invention resides in certain constructions and combinations and arrangement of parts, and other objects and advantages of the invention will be apparent from the following description of a preferred form thereof, reference being made to the accompanying drawings wherein.

Figure 1:
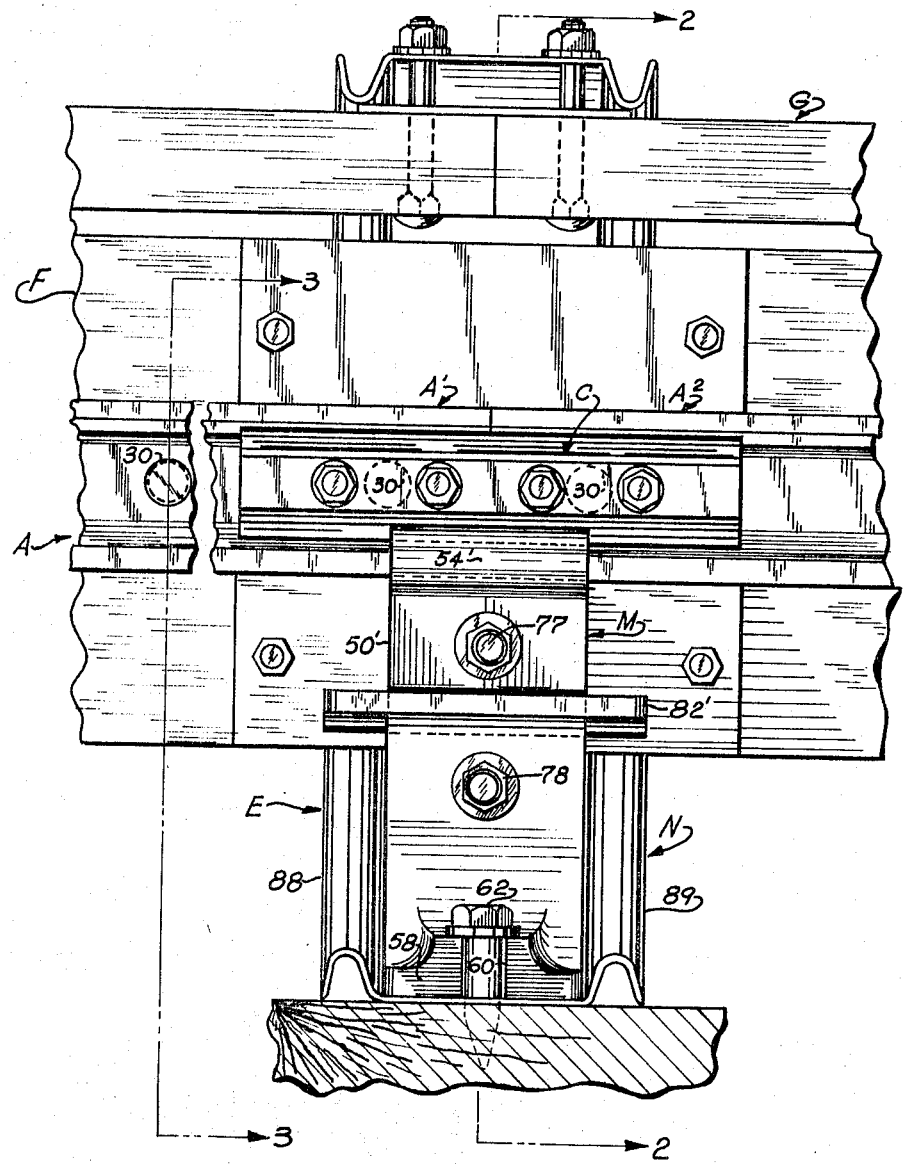
FIG. 1 is a fragmentary, side elevational view of an electric power distribution rail and protective boards therefor in a power distributing system embodying the invention for an electrified railway.

Referring to the drawings, the reference character A designates generally an electrified rail comprising a number of conductor bars or rail sections $A^1$, $A^2$ connected end to end by means including a pair of splice plates B and C and installed alongside a railway, not shown, to supply current to electrically powered vehicles on the railway through a collector shoe assembly D connected to the vehicles. The rail A is supported at suitable intervals therealong by support structure E, only one of which is shown in the drawings and is shielded by protective boards F and G which extend in end to end relation along one side of the rail and overhead thereof, respectively.

Each of the conductor bars or rail sections $A^1$ and $A^2$ is a composite structure formed of a first elongated rail member H of high strength and good wearing qualities, for example, steel, having a cross-sectional shape generally similar to that of a T-beam and a second elongated rail member K of relatively high electrical conductivity, for example, aluminum, having a cross-sectional shape generally similar to that of an I-beam and a medial longitudinal extending slot 12 in one flange side thereof into which the web or stem 13 of the member H is engaged with the underside of the flange portions 14 and 15 of the flange 16 of the T-shaped member engaging the adjoining sides of the flange portions 20 and 21 of the flange 22 of the I-shaped member K. The slot 12 is of such a depth and the height or depth of the web 13 of the T-shaped member H is such that the web 13 projects downwardly through the flange 22 of the I-shaped member and the web thereof to a point adjacent the sides of the flange portions 24 and 25 of the flange 26 of the I-shaped member, which sides face the flange portions 20 and 21 of the flange 22.

The two members H and K are preferably made to relatively close tolerances, are tightly pressed together with the adjoining surfaces in intimate contact and are fixedly connected together at intervals, of approximately two feet or less.

In the embodiment shown, the two members H and K are fixedly secured together at intervals by rivets 30 preferably made of material similar to that of which the member K is formed, which in the present instance is aluminum. The riveting is effected under high pressure which forces the two tined portions 31 and 32 of the member K into tight intimate contact with the adjoining surfaces of the member H. Other types of mechanical fasteners, for example, bolts could be employed in place of rivets. The construction is such that the difference in expansion of the members during use are largely compensated for or counter-balanced and the conductor bars or rail sections remain substantially flat under normal temperature conditions.

The member H, which is made of relatively high strength material having a good wearing quality serves as the part of the conductor bar or rail engaged by the current collector D and the member K made of relatively soft material having high electrical conductivity serves as the primary current carrying part between the feeder connections to the rail A. The composite conductor bars or rail sections incorporate optimum strength and wearing characteristics with optimum current carrying capacity, is of minimum size, requires support at only widely spaced intervals and requires minimum feeder connections. The member H may be a commercially available standard structural steel beam, the member K is preferably an aluminum extrusion. The adjoining surfaces of the two members H and K conform closely to one another thus providing minimum resistance to the transfer of electrical current from the member K of high electrical conductivity to the member H of high strength and good wearing characteristics.

The adjoining ends of any two of the individual conductor bars or rail sections forming the electrified rail A are mechanically and electrically connected by a pair of splice bars or plates B and C at opposite sides of and overlapping the abutting ends of the adjoining rail sections. The splice bars B and C are bolted to the rail sections by bolts 36 which extend through openings in the splice bars and the vertical webs of the rail sections and on which bolts securing nuts 37 are threaded. The holes in the rails through which the bolts 36 project are larger than the bolts, at least lengthwise of the rail A and dish-shaped spring or Belleville-type washers 38 are interposed between the bolt heads and nuts and the adjacent splice bars, respectively, so that a high pressure is maintained between the splice bars and rail sections, but is such that will permit limited relative movement therebetween to accommodate, and expansion and contraction of the conductor bars or rail sections. Each of the splice bars B C have inner inclined surfaces 40 and 41 which conform to the configuration and/or inclination of the inclined adjoining flange surfaces 42 and 43, respectively, of the member K. These are the only surfaces on the flange plates which normally engage the conductor bars or rail surfaces. The construction is such that as the flange plates are bolted in place they wedge against or between the sides of the channels on opposite sides of the rail sections formed by the flange portions 20, 24 and 21, 26, respectively, of the members K. The rivets 30 are fairly flush with the web portion of the conductor bars or rail sections but in order to assure clearance for the rivets adjacent to the ends of the rail sections the side of each of the splice plates facing the web portion is provided with a groove 45.

Figure 2:
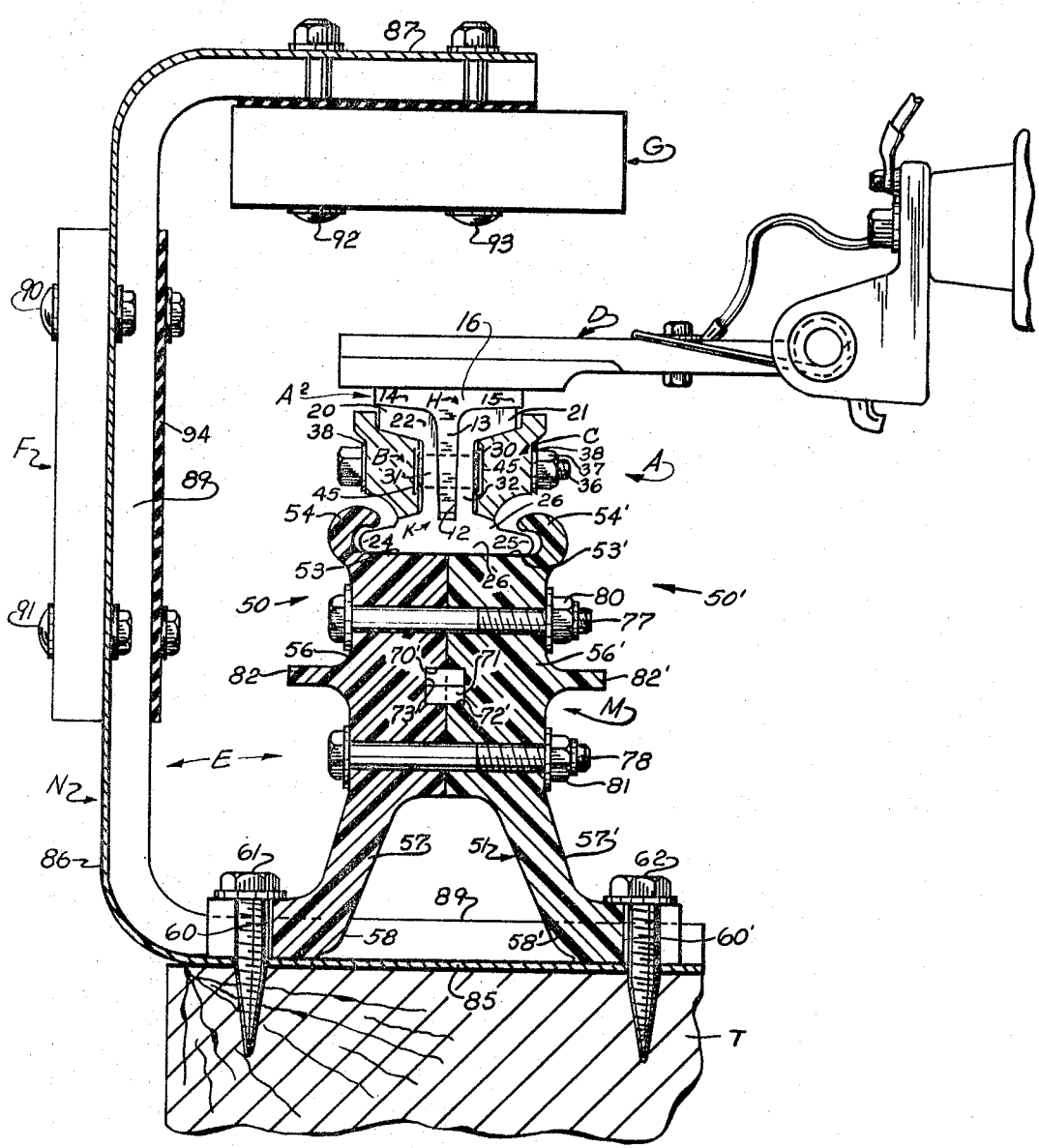
FIG. 2 is a sectional view taken substantially along line 2—2 of FIG. 1 and, in addition, shows a current collector shoe riding on the distribution rail of the system.

Each of the support structures E for the rail A comprises a two member insulator assembly M the respective members of which are duplicates of one another. Because the members of the assembly M are duplicates of one another the members and the corresponding parts thereof are designated by the same reference characters applied prime marks affixed to the right hand member, as viewed in FIGS. 2 and 3 of the drawings.

The bottom flanges 26 of the rail sections H rest on substantially flat load-bearing or supporting surfaces 53 and 53' of the two member insulator assembly M comprising the members 50 and 50' and which has a pair of hold-down or retaining flanges 54 and 54' integral therewith and extending along opposite sides of the load supporting surfaces and parallel to the rail. The flanges 54 and 54' curve upwardly and inwardly over the edge portions of opposite sides of the bottom flanges of the rail members. The surface 53 and the hold-down flange 54 form spaced confronting abutments between which the edge portion of the flange portion 24 of flange 26 is supportingly received, and the surface 53' and hold-down flange 54' provide spaced confronting abutments between which an edge portion of the flange portion 25 of the flange 26 is likewise received. The hold-down flanges 54 and 54' which conform to but are slightly spaced from the conductor bar prevent appreciable lateral or upward movements of the conductor bar relative to the insulator support unit or assembly M and at the same time permit longitudinal shifting of the conductor bar relative to the assembly to accommodate elongation and contraction of the conductor bar which may occur by reason of temperature changes of the conductor bar. The top sides of the flange portions 24 and 25 of the flange 26 are relieved flange 26 is likewise received. The hold-down flanges 54 and 54' of the assembly M. The splice bars B and C are also undercut or relieved to better accommodate or receive the hold-down flanges 54 and 54' where the insulator assemblies M are located at the connection of the two conductor bar or rail sections.

Figure 3:
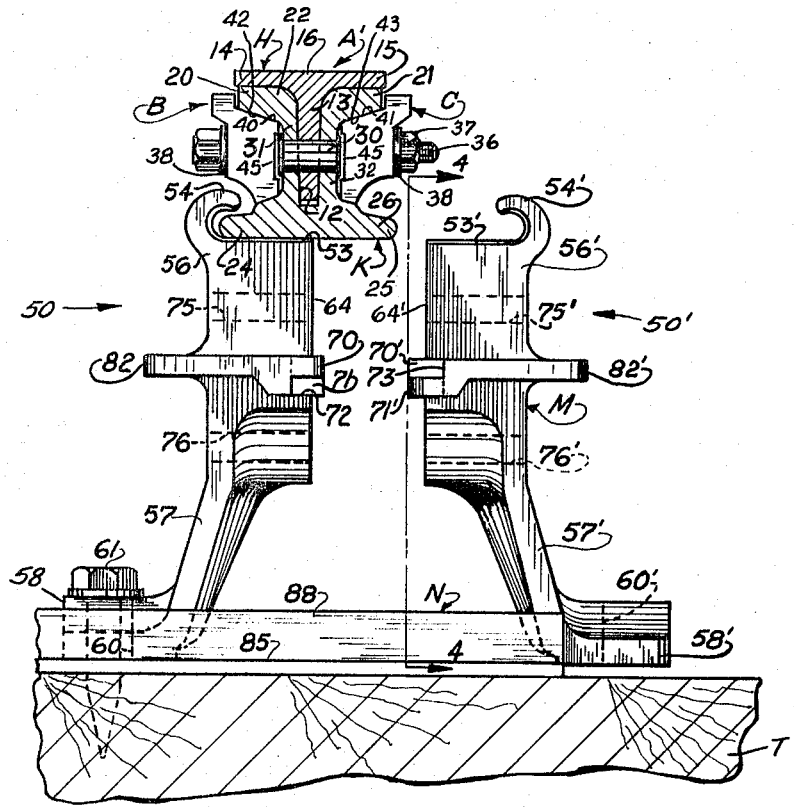
FIG. 3 is a fragmentary view approximately on the line 3—3 of FIG. 1, showing the distribution rail supporting insulator structure partially installed on the rail of the electric distributing system.
Figure 4:
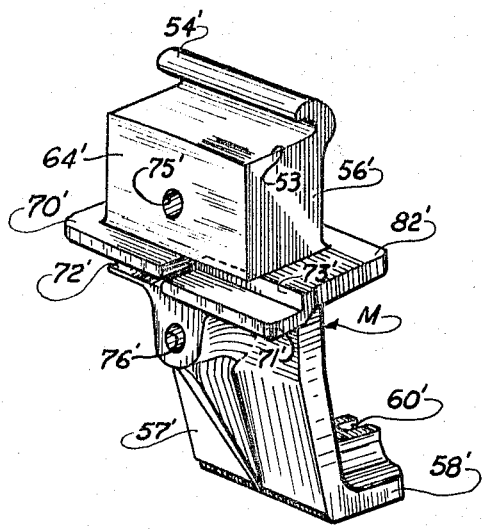
FIG. 4 is a view of a portion of the distribution rail supporting insulator structure approximately on the line 4—4 of FIG. 3.

Referring more particularly to FIG. 3, the two members 50 and 50' of the insulator assembly M, as previously stated, are duplicates. The members are preferably fabricated of suitable molded resin, such as epoxy, reinforced with fiber glass. Each member includes a block-like body 56 having a supporting leg 57 terminating in a foot portion 58 in which a slot 60 is formed to receive an anchor bolt 61 and 62. The top surface of the body portion 56 of the member 50 includes or forms the load supporting surfaces 53 and the hold-down flange 54, respectively. In the form shown, the insulator assembly members 50 and 50' have complementary abutting surfaces 64 and 64' which when in contact with one another lie principally on a plane normal to and intersecting that of the load bearing surface for the conductor bars or rail sections, and extending parallel to the direction of the length of the rail sections. The surfaces of the assembly M which face the conductor bar including the supporting surface formed by the surfaces 53 and 53' and the inner sides of the flanges 54 and 54' are not flat or straight but are curved or beveled lengthwise of the direction in which the conductor bar extends, the high point being adjacent to mid-point of the assembly. In the embodiment shown, these surfaces are beveled at an angle of approximately 7°. This permits the support structure E to be placed on a surface having a slight tilt relative to the conductor bar or rail A without interfering with the conductor bar or rail. Any desired suitable bevel angle or curved arrangement may be employed. Each of the members 50 and 50' is provided with two projecting flanges 70 and 71 offset relative to one another as shown in FIG. 3, which, when the parts are assembled together, engage in complementary grooves 72 and 73 formed in the members 50 and 50'. The ledges or flanges 70 and 71 and the grooves within which they are received form a tongue and groove structure for effecting a strong interlock of the two members 50 and 50'. The members 50 and 50' are also provided with aligned openings 75 and 76 which receive securing bolts 77 and 78, respectively, on which nuts 80 and 81 are threaded to tightly clamp the two members 50 and 50' together, as seen best in FIG. 2. In the embodiment shown the members 50 and 50' are provided with flange portions 82 and 82' which reinforce the members and extend the length of the interlocking tongues and grooves without making the members unduly large and heavy.

By forming the insulator assemblies M of two members, they can be readily assembled in supporting relation with the rail A or disassembled and removed from the rail without disturbing or altering the rail.

The insulator assemblies M are each located on a laterally extending foot or base section 85 of a C-shaped bracket N which is preferably formed of a suitable sheet material, such as aluminum, and which in addition to the foot section 85 includes an upright section 86 and an overhead section 87. Ridges 88 and 89 are formed along the opposite side edge portions of the bracket for imparting rigidity thereto and in addition to provide locating means for the feet 58 and 58' of the insulator assemblies M. The base section 85 rests on a suitable foundation which may be a portion of a railway tie T, and the insulator assembly M and bracket N are anchored to the tie by the screws 61 and 62. It will be appreciated that the bracket N and the insulator assembly M comprise the support structure E and that the rail A is supported by a multiplicity of these structures located at suitable intervals throughout its length.

The upright portions 86 and overhead portions 87 of the bracket N provide supports for the protector boards F and G, respectively, which boards are secured thereto by suitable carriage bolts 90, 91 and 92, 93, respectively. One bracket may support the adjacent ends of two aligned boards, as shown in the drawing. The boards extend throughout the length of the rail A to partially shield the rail. Preferably, a shield or plate 94 formed of suitable insulating material is bolted to the ridges 88 and 89 of the brackets N to help prevent contact of the current collector with the upright portions 86 of the brackets. It will be noted that as shown the boards F on the outside of the bracket N and the boards G are on the inside of the bracket, either arrangement may be employed.

Installation of the supporting insulator assemblies M along the rail A is effected by first separating the members 50 and 50' thereof and then positioning the member 50 so that the under side of rail flange 26 rests on the surface 53 and the hold-down flange 54 overlies the outer edge portion of the flange. The leg 57 of the member is positioned on the section 85 of the bracket N between the ridges 88 and 89 thereof and secured to the bracket and tie T by the screw 61. The member 50' is then manipulated to position surface 53' against the underside of the rail flange 26 with the hold-down flange 54' overlying the upper edge portion of the rail flange. The leg 57' is positioned between the ridges 88 and 89 of the bracket base N and the openings 75 and 75' aligned with the corresponding openings in the member 50. The members 50 and 50' are then secured together by the bolts 77 and 78. The member 50' is then fixed to the tie T by inserting the screw 62. It will be appreciated that the interlocking flanges or ledges 70, 71 and 70', 71' and grooves 72, 73 and 72', 73' of the members 50 and 50' assist in maintaining these members in proper alignment.

The ridges 88 and 89 of the bracket N are spaced apart so as to closely receive the foot portions of the members 50 and 50' therebetween which facilitates aligning the two insulator assembly members and contributes to firmly locating the support assemblies in position.

Should it become necessary to replace any of the insulator assemblies M, the assemblies are readily disassembled by removing the bolts 77 and 78 and the screws 61 and 62 so that the individual members 50 and 50' can be separated and disengaged from the rail A. A new assembly M may then be easily installed in the manner described, if desired.

It will be appreciated that the support structures may be spaced along the electrified rail A at suitable intervals and that the initial installation as well as any necessary replacements thereof can be effected without disturbing the rail by reason of the manner in which the parts of the assemblies are individually applied to opposite sides of the rail and then secured together in supporting relation to the rail.

It will be apparent that the insulator assemblies M provide positive support for the electrified rail A and secure the rail against lateral and vertical movements while at the same time permitting shifting or slippage thereof in a longitudinal direction.

Although the novel support structure has been shown and described with the conductor rail resting on the support surfaces 53 and 53', thereof, the conductor rail could be supported in an overhead position and inverted with respect to the position shown, in which event, the insulator assemblies would be suspended from suitable overhead support means, and the current collector would be spring-biased upwardly so as to engage the flange of the wear resistance T-shaped rail member.

While the preferred embodiment of the invention has been described in considerable detail it is to be understood that the invention is not limited to the particular constructions shown and it is the intention to cover hereby all modifications and adaptations thereof which come within the practice of those skilled in the art to which the invention relates and the scope of the appended claims.

I claim:

1. In an electric power distributing system for a railway or the like, a conductor bar including support flange means forming two oppositely facing spaced edge portions extending along said conductor bar, a support assembly supporting said bar and comprising two separable members each having spaced confronting abutment means loosely and movably receiving therebetween only said edge portions of said support flange means and engaging confronting surfaces, and means for securing said members together with said confronting surfaces in engagement with one another and with said abutment means of one member receiving overlying one of said edge portions only of said support flange means and the abutment means of the other of said member receiving and overlying the other of said edge portions only of said support flange means.

2. In an electric power distributing system for a railway and the like, a conductor bar having a support flange means extending laterally from one edge and along opposite sides thereof, a support unit supporting said bar, said unit having a surface engaging a transverse surface of said flange means, said support unit comprising two parts separable in a plan extending transversely to said surface and in the general direction in which said conductor bar supported thereby extends, said parts having hold-down flanges along opposite sides of said surface and extending around the outer edges only of said support flange means for loosely and movably receiving the outer edges of said support flange means but limiting movement of said conductor bar from said surface, and means for securing said parts together in a unitary relationship and to prevent separation of said hold down flanges from one another.

3. In an electric power distributing system for a railway or the like, a conductor bar including support flange means forming two spaced edge portions extending along opposite sides of said rail, a support assembly comprising two separable members having interlocking complementary surfaces engaged with one another and each member having spaced confronting abutment means loosely and movably receiving therebetween said edge portions only of said support flange means respectively to thereby support said bar, and means securing said members together with portions of said abutment means of one member overlying only the edge of one of said edge portions of said support flange means and portions of the said abutment means of the other of said members overlying only the edge of the other of said edge portions of said support flange means.

4. In an electric power distributing system for a railway or the like, a conductor bar including support flange means forming two spaced edge portions extending along said rail, a support assembly comprising two separable members each having engaging confronting surfaces and abutment surfaces loosely and movably receiving therein said edge portions only of said support flange means respectively to thereby support said bar, and means for securing said members together with said confronting surfaces engaging one another and portions of said abutment surfaces of one member overlying only the edge of one of said edge portions of said support flange means and portions of said abutment surfaces of the other of said members overlying only the edge of the other of said edge portions of said support flange means, said abutment surfaces diverging from approximately the mid-transverse plane of said support assembly to the ends thereof.

5. A support unit for loosely receiving and supporting a conductor bar of an electrical power distributing system which bar has an outwardly extending flange portion along opposite sides thereof, said unit comprising two separable members having engaging surfaces, one member having a first abutment surface adapted to be engaged by one side of one of the flange portions of the bar and a second abutment surface spaced from said first abutment surface but facing said first abutment surface for overlying but being slightly spaced from the edge portion only of one of the flange portions on the side of the flange portion remote from said first abutment surface, the other part having a first abutment surface adapted to be engaged by the first mentioned side of the other of the flange portions of the bar adjacent to the portion of the bar engaged by said first abutment surface of the first mentioned member and a second abutment surface spaced from said first abutment surface of said other member but facing said first abutment surface of said other member for overlying but being slightly spaced from the edge portion only of the other of the flange portions of the bar on the side thereof remote from the said first abutment surface of said other member.

6. A support unit for loosely receiving and supporting a conductor bar of an electrical power distributing system which bar has outwardly extending flange portions along opposite sides thereof, said unit comprising two separable members having engaging confronting surfaces, each having a body one surface of which forms an abutment for engaging one side of an adjacent flange portion of the conductor bar and a portion along one edge of said body reversely curved and extending in spaced relation to said surface of said body for forming with said surface a recess for loosely receiving an edge only of the adjacent flange portion of the bar, and means for releasably securing said members together with the reversely curved parts thereof at opposite sides and extending toward one another.

7. A support unit for loosely receiving and supporting a conductor bar of an electrical power distributing system which bar has outwardly extending flange portions along opposite sides thereof, said unit comprising two separable members having engaging confronting surfaces, each having a body one surface of which forms an abutment for engaging one side of an adjacent flange portion of the conductor bar and a portion along one edge of said body reversely curved and extending in spaced relation to said surface of said body for forming with said surface a recess for loosely receiving an edge only of the adjacent flange portions of the bar, the surfaces of said body confronting the conductor bar diverging in the direction away from the conductor bar from approximately the medial transverse plane of the support unit to the ends thereof, and means for releasably securing said members together with the reversely curved parts thereof at opposite sides and extending toward one another.

8. A support unit for a conductor bar of an electrical power distributing system which bar has outwardly extending flange portions along opposite sides thereof, said unit comprising two separable members, each having a body one surface of which forms an abutment adapted to be engaged by one side of an adjacent flange portion of the conductor bar and a portion along one edge of said body reversely curved and extending in spaced relation to said surface of said body for forming with said surface a recess for loosely receiving an edge only of the adjacent flange portion of the bar, said bodies of said members having engaging confronting surfaces, means forming interengaging projections and recesses on said surfaces when said members are aligned and in engagement with one another, and means for releasably securing said members together with the reversely curved parts thereof at opposite sides and extending toward one another.

9. A support unit for a conductor bar of an electrical power distributing system which bar has a flange providing outwardly extending flange portions along opposite sides thereof, said unit comprising two separable members, each having a body forming an abutment surface for engaging one side of the flange of the bar and a portion along one edge of said body reversely curved and extending in spaced relation to said body for forming with said abutment surface a recess for receiving an edge portion only of one of the flange portions of the bar, said bodies of said members having engaging confronting surfaces, one of said surfaces having a transversely extending ledge thereon and the other surface having a recess to closely receive the sides of said ledge when said surfaces are in engagement, and means for releasably securing said members together with the reversely curved parts thereof at opposite sides and extending toward one another.

10. In an electric power distributing system for a railway and the like, a conductor bar including a support flange extending along one side thereof, a support unit installed along said bar for supporting said bar, said unit having abutment means lying in a plane transversely of said bar at said one side thereof, said support unit comprising two complementary symmetrically formed members each having abutting surfaces lying substantially in a plane normal to and medially of the plane of said abutment means, said abutting surfaces having tongue and groove formations interlocking said members, each of said members having a flange along the edge of said abutment means, said flange curving over but spaced from only the edge portion of said supporting flange adjacent thereto, means detachably securing said members together, and means for attaching said support unit to a foundation.

11. In an electric power distributing system for a railway and the like, a conductor bar having a support flange means extending laterally from one edge and along opposite sides thereof, a support unit supporting said bar, said unit having a surface engaging a transverse surface of said flange, said support unit comprising two separable parts, each of said parts having a hold-down flange projecting laterally beyond the plane of said holding surface and around but spaced from the edge portion only of said flange engaging said holding surface and limiting movement of said conductor bar flange from said holding surface, each of said parts including a leg projecting in a direction away from said holding surface thereof, and means for securing said parts together in a unitary relationship.

12. In an electric power trolley-type conductor or rail adapted to be engaged by a collector member: a plurality of lengths of conductor bar arranged end to end; each of said conductor bars comprising an elongated first member formed of material of relatively high electrical conductivity having a central web and flange portions along opposite elongated edges of said web extending laterally from opposite sides thereof and forming with said web outwardly facing channels along opposite sides of said member, at least one of said channels having inner inclined side wall portions converging toward said web, one elongated side of said web having an aperture therein coextensive with the length thereof, an elongated second member formed of material of relatively high strength having a web closely received in said aperture and a transversely extending flange along one elongated edge thereof overlying and closely engaging the flange portions of said first member extending at opposite sides of the opening of said aperture and forming a collector's shoe slide surface, means at spaced intervals along said members fairly flush with said central webs thereof and fixedly securing the same together; means securing adjoining ends of adjacent members together comprising splice plates received in said channels at opposite sides of said adjoining ends and overlying said ends; at least one of said splice plates having inclined surfaces in engagement with said inclined side surfaces of said one channel in which it is received; and bolts extending through openings in said splice plates and said ends of said conductor bars clamping said splice plates to said ends of said conductor bars and wedging said engaging inclined surfaces together; said splice plates having medial channels in the sides thereof adjacent to the web portion of said conductor bars for receiving portions of said means securing said first and second members of said channel members together protruding beyond the sides of said web portions; portions of said one splice plate adjacent to said flange portions of said first member remote from said flange portions of said second member of said conductor bar being cut away to better accommodate supporting assemblies; assemblies supporting said conductor bars at spaced intervals, each of said support assemblies comprising two separable members, each having a flange portion along one edge reversely curved and extending into said cut away portions of said one flange plate and forming a recess into which an edge of the adjacent flange portion of the conductor bar is received, and means for releasably securing said members together with the flange portions thereof at opposite sides of said conductor bars, extending toward one another and engaging about the edges of the adjacent flange portions of said first member of said conductor bars which flange portions are remote from the flange portions of said second member of said conductor bars.

13. In an electrical power trolley-type conductor distribution system for railways and the like: a plurality of lengths of conductor bar arranged end to end; each of said conductor bars comprising an elongated first member formed of material of relatively high electrical conductivity having a central web and flange portions along opposite elongated edges of said web extending laterally from opposite sides thereof and forming with said web outwardly facing channels along opposite sides of said member, at least one of said channels having inner inclined side wall portions converging toward said web, one elongated side of said web having an aperture therein coextensive with the length thereof, an elongated second member formed of material of relatively high strength having a web closely received in said aperture and a transversely extending flange along one elongated edge thereof overlying and closely engaging the flange portions of said first member extending at opposite sides of the opening of said aperture and forming a collector's shoe slide surface, means at spaced intervals along said members and fixedly securing the same together; means securing adjoining ends of adjacent members together comprising splice plates received in said channels at opposite sides of said adjoining ends and overlying said ends; at least one of said splice plates having inclined surfaces in engagement with said inclined side surfaces of said one channel in which it is received; and bolts extending through openings in said splice plates and said ends of said conductor bars clamping said splice plates to said ends of said conductor bars and wedging said engaging inclined surfaces together; parts of said flange portions of said first member of said conductor bars remote from said flange portions of said second member of said conductor bars and portions of said one splice plate adjacent thereto being cut away; assemblies supporting said conductor bars at spaced intervals, each of said support assemblies comprising two separable members, each having a flange portion along one edge reversely curved and extending into said cut away portions of said one flange plate and forming a recess into which an edge of the adjacent flange portion of the conductor bar is received, and means for releasably securing said members together with the flange portions thereof at opposite sides of said conductor bars, extending toward one another and engaging about the edges of the adjacent flange portions of said first member of said conductor bars which flange portions are remote from the flange portions of said second member of said conductor bars.

14. In an electrical power trolley-type conductor distribution system for railways and the like: a plurality of lengths of conductor bar arranged end to end; each of said conductor bars comprising an elongated first member having a central web and flange portions along opposite elongated edges of said web extending laterally from opposite sides thereof and forming with said web outwardly facing channels along opposite sides of said member, at least one of said channels having inner inclined side wall portions converging toward said web, said flange portions along one elongated edge of said web portion forming a collector's shoe slide surface; means securing adjoining ends of adjacent members together comprising splice plates received in said channels at opposite sides of said adjoining ends and overlying said ends; at least one of said splice plates having inclined surfaces in engagement with said inclined side surfaces of said one channel in which it is received; and bolts extending through openings in said splice plates and said ends of said conductor bars clamping said splice plates to said ends of said conductor bars and wedging said engaging inclined surfaces together; support assemblies supporting said conductor bars at spaced intervals; each of said support assemblies comprising two separable members, each having a flange portion along one edge thereof reversely curved and forming a recess into which an edge only of the adjacent flange portion of the conductor bar is received; and means for releasably securing said members together with the flange portions thereof at opposite sides of said conductor bars, extending toward one another and engaging about the edges only of the adjacent flange portions of said conductor bars which flange portions are remote from the flange portions of said conductor bars which form the side surface for the collector shoes.

15. In an electrical power trolley-type conductor distribution system for railways and the like: a plurality of lengths of conductor bar arranged end to end; each of said conductor bars comprising an elongated first member having a central web and flange portions along opposite elongated edges of said web extending laterally from opposite sides thereof and forming with said web outwardly facing channels along opposite sides of said member, at least one of said channels having inner inclined side wall portions converging toward said web, said flange portions along one elongated edge of said web portion forming a collector's shoe slide surface; means securing adjoining ends of adjacent members together comprising splice plates received in said channels at opposite sides of said adjoining ends and overlying said ends; at least one of said splice plates having inclined surfaces in engagement with said inclined side surfaces of said one channel in which it is received; and bolts extending through openings in said splice plates and said ends of said conductor bars clamping said splice plates to said ends of said conductor bars and wedging said engaging inclined surfaces together; and portions of said one splice plate adjacent said flange portions along the other elongated edge of said web portion of said conductor bars being cut away; support assemblies supporting said conductor bars at spaced intervals; each of said support assemblies comprising two separable members, each having a flange portion along one edge thereof reversely curved and extending into said cut away portions of said conductor bars and forming a recess into which an edge of the adjacent flange portion of the conductor bar is received; said members having engaging confronting surfaces; and means for releasably securing said members together with the flange portions thereof at opposite sides of said conductor bars, extending toward one another and engaging about the edges only of the adjacent flange portions of said conductor bars which flange portions are remote from the flange portions which form the contact surface for the collector shoes.

References Cited

UNITED STATES PATENTS

| | | | |
|---|---|---|---|
| 726,269 | 4/1903 | Everett | 191—32 |
| 849,703 | 4/1907 | Stewart | 191—30 |
| 1,141,766 | 6/1915 | Burke | 238—145 |
| 1,454,296 | 5/1923 | Pardodi | 191—30 |
| 2,161,340 | 6/1939 | Disbrow | 238—159 |
| 2,502,756 | 4/1950 | Schmid | 191—32 |
| 3,207,858 | 9/1965 | Langlois et al. | 191—33 |
| 3,222,464 | 12/1965 | Dehn | 191—22 |

FOREIGN PATENTS 706,543    3/1931    France.

EUGENE G. BOTZ, *Primary Examiner*.